(12) United States Patent
Benedetti

(10) Patent No.: US 11,369,998 B2
(45) Date of Patent: *Jun. 28, 2022

(54) APPARATUS FOR TREATING HORTICULTURAL PRODUCTS

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 130 days.

This patent is subject to a terminal disclaimer.

(21) Appl. No.: 16/614,726

(22) PCT Filed: May 11, 2018

(86) PCT No.: PCT/IB2018/053295
§ 371 (c)(1),
(2) Date: Nov. 18, 2019

(87) PCT Pub. No.: WO2018/211384
PCT Pub. Date: Nov. 22, 2018

(65) Prior Publication Data
US 2020/0179984 A1     Jun. 11, 2020

(30) Foreign Application Priority Data
May 16, 2017 (IT) .................. 102017000052593

(51) Int. Cl.
*B07C 5/342* (2006.01)
*B07C 5/36* (2006.01)
(Continued)

(52) U.S. Cl.
CPC .............. *B07C 5/342* (2013.01); *B07C 5/36* (2013.01); *B07C 5/02* (2013.01); *B07C 5/10* (2013.01);
(Continued)

(58) Field of Classification Search
CPC .. B07C 5/342; B07C 5/36; B07C 5/10; B07C 2501/009; B07C 5/16; B65G 2201/0211
See application file for complete search history.

(56) References Cited

U.S. PATENT DOCUMENTS

| 4,106,628 A * | 8/1978 | Warkentin ............... B07C 5/18 |
| | | 177/145 |
| 4,901,861 A * | 2/1990 | Cicchelli .................. A23N 4/00 |
| | | 198/690.2 |

(Continued)

FOREIGN PATENT DOCUMENTS

| CL | 2019003238 A1 | 2/2020 |
| CN | 1408615 A | 4/2003 |

(Continued)

OTHER PUBLICATIONS

International Search Report dated Aug. 1, 2018 re: Application No. PCT/IB2018/053295, pp. 1-3, citing: EP 2 676 904 A1, EP 0 105 453 A2 and WO 2015/167345 A1.

(Continued)

*Primary Examiner* — Michael McCullough
*Assistant Examiner* — Jessica L Burkman
(74) *Attorney, Agent, or Firm* — Cantor Colburn LLP

(57) ABSTRACT

An apparatus for treating horticultural products includes in series at least: a first station, which has first elements for the individual handling of respective horticultural products, and at least one vision system, for the acquisition of information related to at least one parameter of interest of each horticultural product. A second station includes second elements for the individual handling of respective horticultural products and at least one device for weighing each horticultural product in transit, and a third station, which includes third elements for the individual handling of respective horticultural products. The first elements, the second elements and (Continued)

the third elements are offset along two respective laterally adjacent trajectories for the advancement of the horticultural products.

9 Claims, 16 Drawing Sheets

(51) Int. Cl.
    *B07C 5/02*     (2006.01)
    *B07C 5/10*     (2006.01)
    *B07C 5/16*     (2006.01)

(52) U.S. Cl.
    CPC .......... *B07C 5/16* (2013.01); *B07C 2501/009* (2013.01); *B65G 2201/0211* (2013.01)

(56) References Cited

U.S. PATENT DOCUMENTS

| | | | |
|---|---|---|---|
| 6,533,126 B1* | 3/2003 | Parsons | B07B 13/075 209/617 |
| 2001/0032807 A1* | 10/2001 | Powell, Jr. | B07C 5/36 209/592 |
| 2013/0334109 A1* | 12/2013 | Liedl | B65G 43/08 209/541 |

FOREIGN PATENT DOCUMENTS

| | | |
|---|---|---|
| CN | 1845861 U | 10/2006 |
| CN | 101507962 A | 8/2009 |
| CN | 203428496 U | 2/2014 |
| CN | 204182591 U | 3/2015 |
| CN | 105057226 A | 11/2015 |
| CN | 105251703 A | 1/2016 |
| CN | 106000914 A | 10/2016 |
| CN | 106140680 A | 11/2016 |
| CN | 106564645 A | 4/2017 |
| EP | 0105453 A2 | 4/1984 |
| EP | 2676904 A1 | 12/2013 |
| WO | 2015167345 A1 | 11/2015 |
| WO | 2016042442 A1 | 3/2016 |

OTHER PUBLICATIONS

IT Search Report dated Jan. 26, 2018 re: Application No. IT 2017000052593, pp. 1-6, citing: EP 2 676 904 A1, EP 0 105 453 A2 and WO 2015/16734 A1.

Written Opinion dated Aug. 1, 2018 re: Application No. PCT/IB2018/053295, pp. 1-4, citing: EP 2 676 904 A1, EP 0 105 453 A2 and WO 2015/167345 A1.

\* cited by examiner

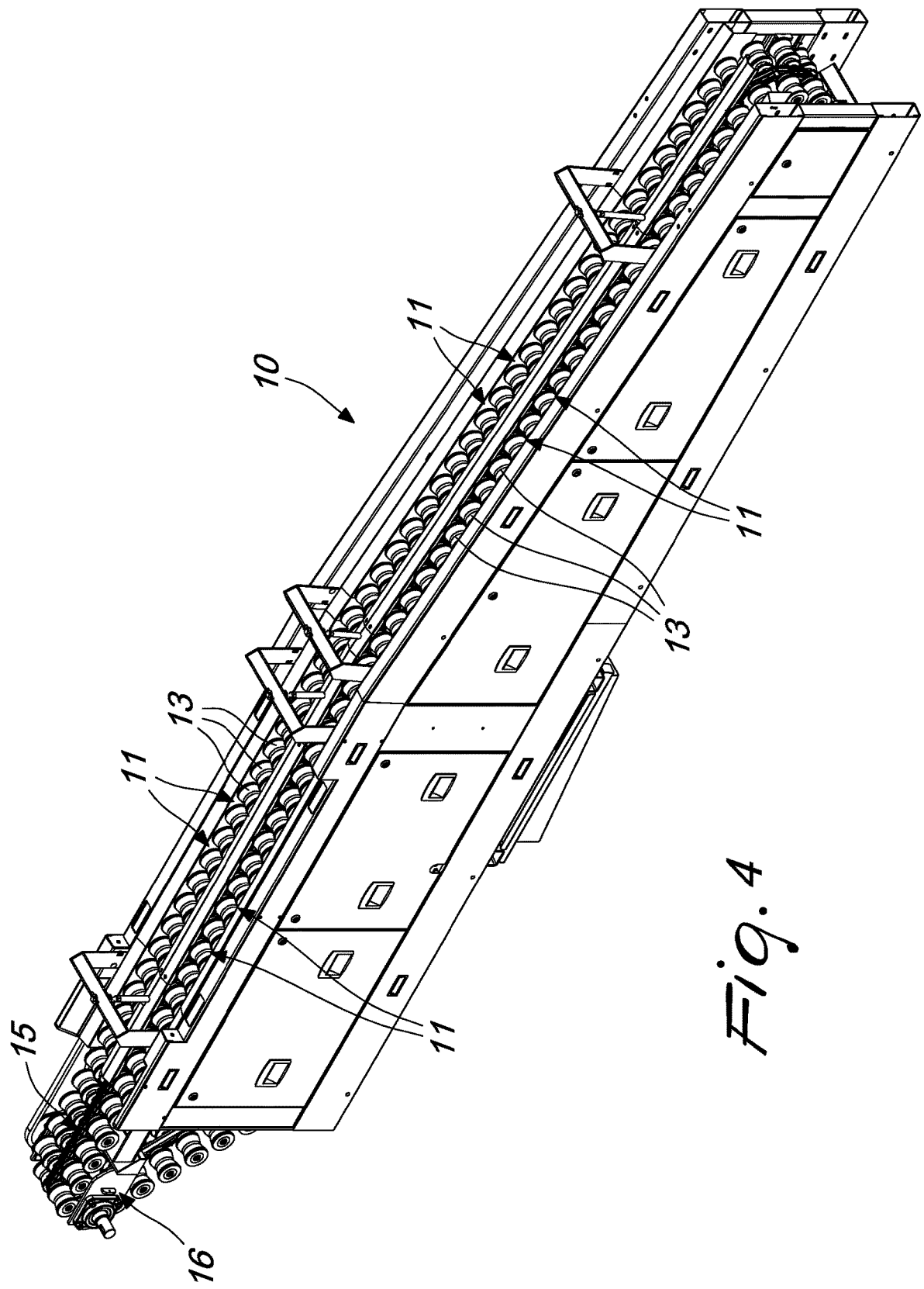

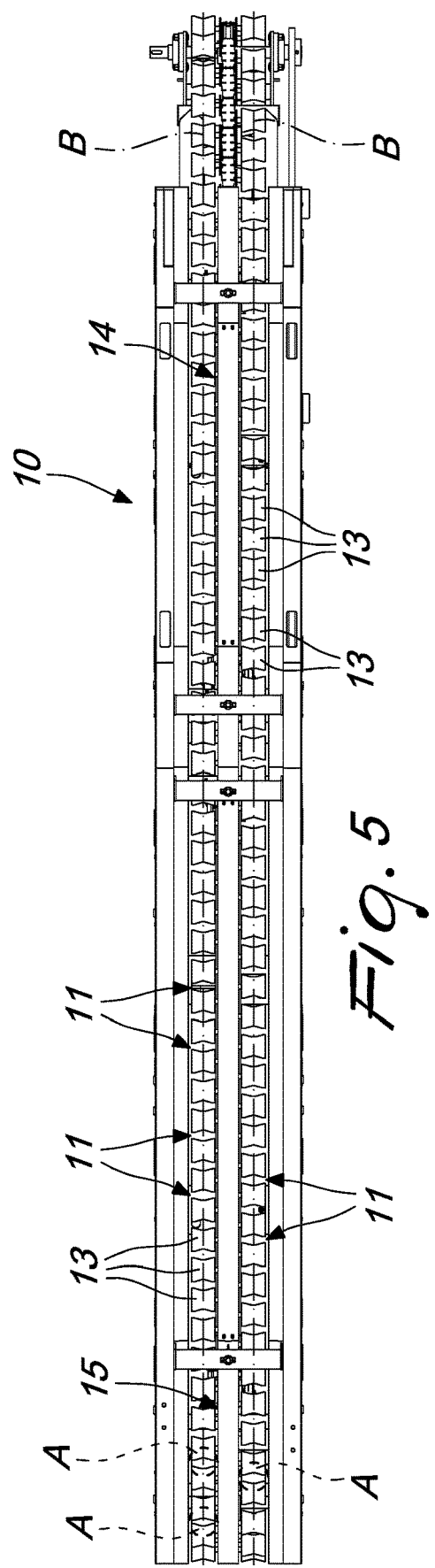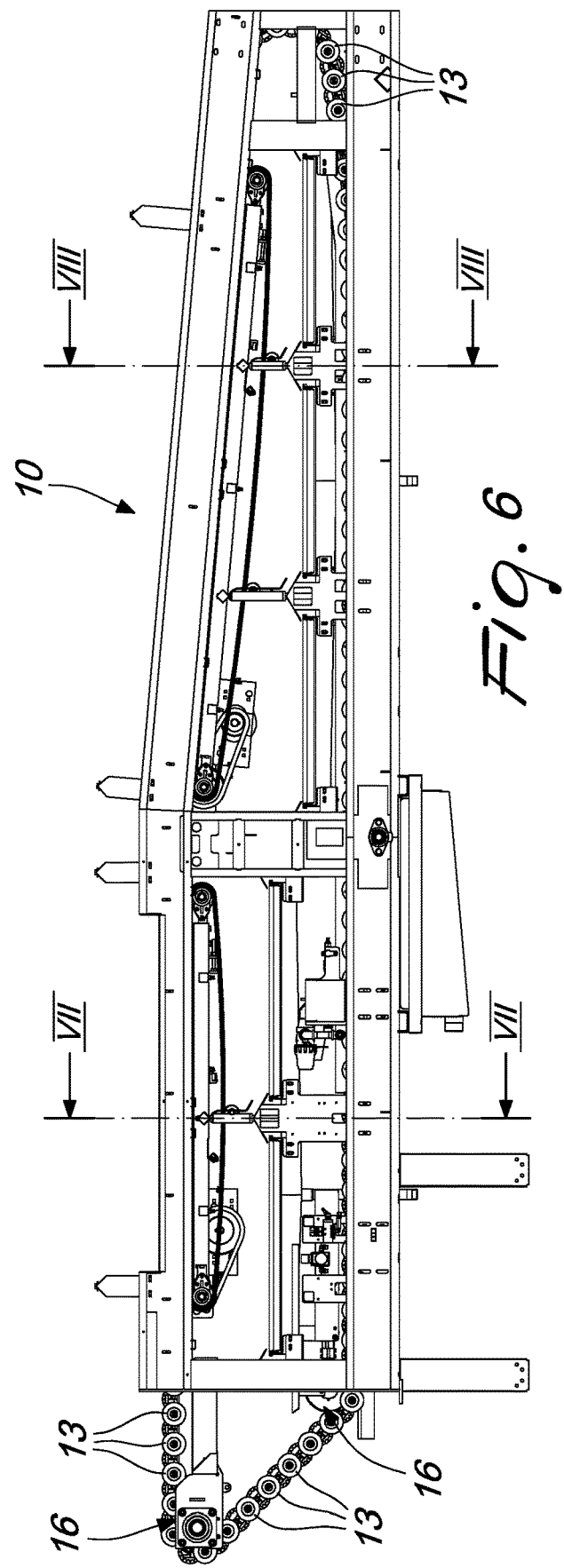

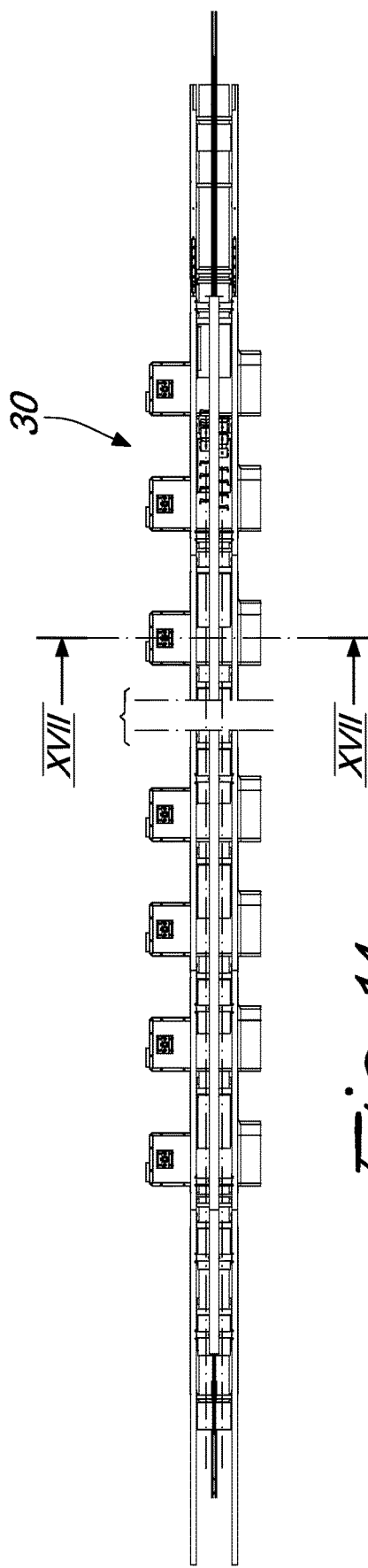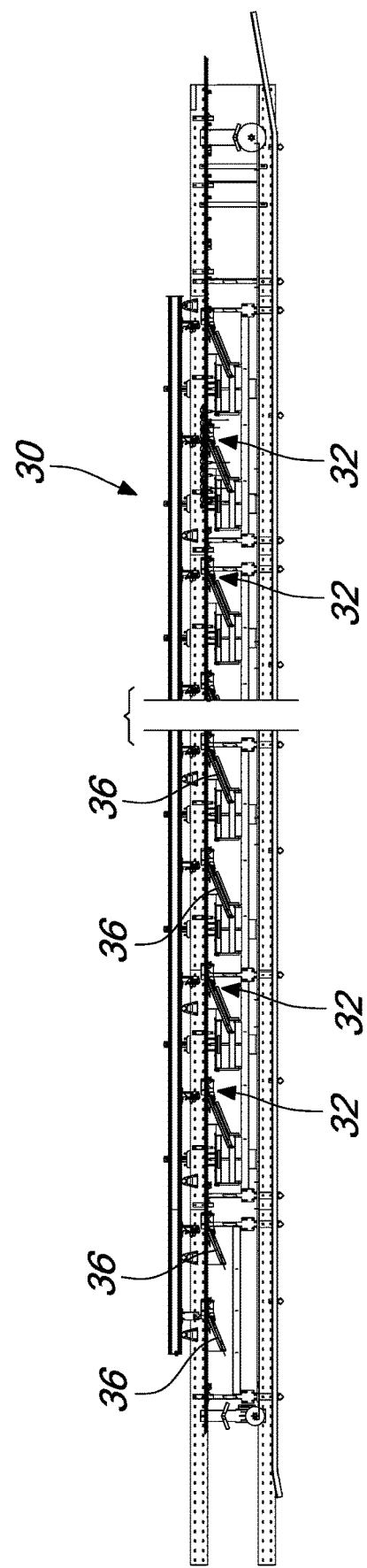

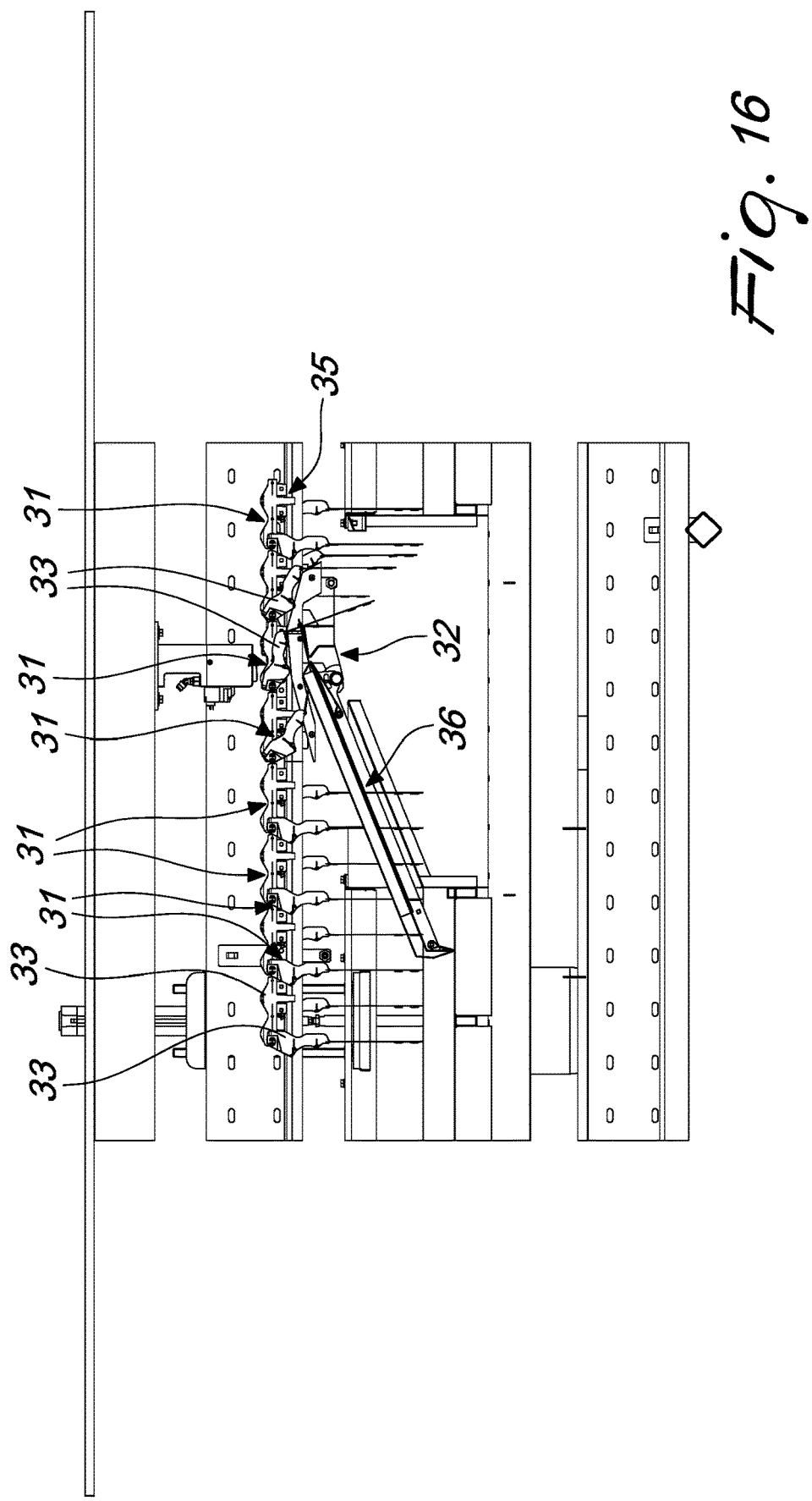

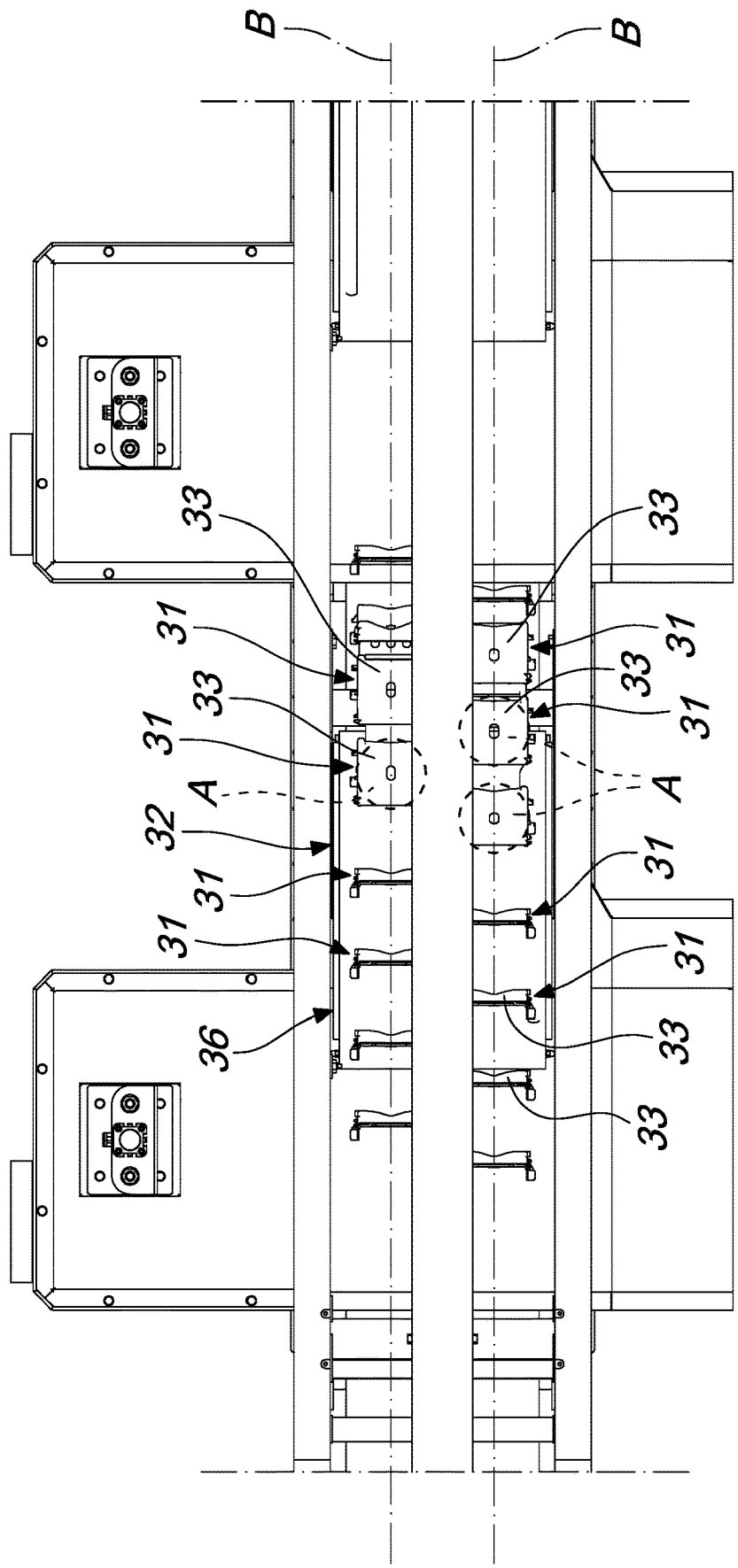

US 11,369,998 B2

APPARATUS FOR TREATING HORTICULTURAL PRODUCTS

CROSS REFERENCE TO RELATED APPLICATIONS

This application is filed under 35 U.S.C. § 371 as the national stage of International Patent Application No. PCT/IB2018/053295 filed on May 11, 2018, which claims priority to Italian Patent Application No. 102017000052593 filed on May 16, 2017, all of which said applications are hereby incorporated by reference in their entirety.

TECHNICAL FIELD

The present disclosure relates to an apparatus for treating horticultural products.

BACKGROUND

As is known, the gradual automation of processes involves an ever-increasing number of industrial sectors, since only in this way is it possible to combine the contrasting needs of the market, which on one hand requires ever lower costs and on the other hand still imposes high qualitative standards even on mass productions.

This trend can be observed easily also in the processing of horticultural products, where indeed it is now frequent to use completely or partially automated lines, often configured to perform different treatments on a specific horticultural product.

In greater detail, many companies in this sector acquire apparatuses or lines designed to be fed with unsorted masses of the product of interest, often coming directly from the places of harvest. These constructive solutions are thus composed of a plurality of stations, through which the product passes while indeed it is subjected to various treatments, checks and processes in general.

In this context, a type of apparatus is known, used for example in the processing of apples, wherein at least three stations follow one another sequentially: in each station, the products move one by one in a row along a preset path, by virtue of the action of respective individual transfer elements.

The first station is fed with unsorted masses of apples, which thus have great heterogeneity in terms of dimensions, color, quality, et cetera. In the first station, the apples in transit pass through the field of action of a video camera, or other similar vision system, which is capable of performing qualitative analyses on the products, by checking their color, their degree of ripeness and/or the presence of defects (superficial or internal), as well as other properties and parameters of possible interest.

From that station, each apple is picked up by a respective clamp, which moves along a closed path dragged by a belt wound in a loop, in order to bring the apple toward the third station. Along the second station each apple is weighed, and the information thus acquired, together with the information detected by the vision system, is provided to an electronic control and management unit, capable of activating selectively one of a plurality of unloading systems, which are distributed along the path that the apples follow in the third station.

Each unloading system is capable of guiding the apples in transit to a respective collection basket, and thus while the apples advance progressively aligned along the third station, as a function of the specific information acquired each apple is sent by the electronic unit to the appropriate basket, which can thus receive all and only the apples falling within preset parameters.

In this manner, downstream of the apparatus the users can find homogeneous baskets, to be sent to packaging in order to be marketed (or, obviously, undergo further treatments or checks).

This constructive solution, however, is not free from drawbacks.

As mentioned, along the three stations defined above the apples move (horizontally) one by one in a row along a trajectory, usually a rectilinear one, imposed by the transfer elements that operate in each station.

In such a configuration, clearly the productivity of the apparatus (understood as number of apples transferred and treated in the unit time) is determined by the slowest of the three stations: this is a very unwelcome limit, since often at least one of the three stations must operate at modest speeds, due to technological limitations linked to the type of elements involved and to the operations performed thereby on the products.

It should be noted, however, that the apparently more obvious solution to the problem, constituted by the simple side-by-side arrangement of two or more identical lines, is often unfeasible, since it would entail an excessive increase in occupied spaces, which in practice is as unwelcome as the limited productivity described above.

SUMMARY

The aim of the present disclosure is to solve the problems described above, by providing an apparatus capable of performing a plurality of treatments on apples or other horticultural products, ensuring high productivity and limited space occupations.

Within this aim, the disclosure provides an apparatus capable of distributing in a uniform manner apples or other horticultural products, ensuring high productivity and limited space occupations.

The disclosure also provides an apparatus that ensures high reliability in operation.

The present disclosure further proposes an apparatus that uses a technical and structural architecture that is alternative to those of the apparatuses of the known type.

The disclosure provides an apparatus that can be obtained easily starting from commonly commercially available elements and materials.

The disclosure further provides an apparatus that has modest costs and is safe in use.

This aim and these and other advantages that will become better apparent hereinafter are achieved by an apparatus according to claim 1.

BRIEF DESCRIPTION OF THE DRAWINGS

Further characteristics and advantages of the disclosure will become better apparent from the description of a preferred but not exclusive embodiment of the apparatus according to the disclosure, illustrated by way of non-limiting example in the accompanying drawings, wherein:

FIG. 4 is a perspective view of the first station of the apparatus of FIG. 1, without the vision system;

FIG. 5 is a top view of the first station of the apparatus of FIG. 1, without the vision system;

FIG. 6 is a side elevation view of the first station of the apparatus of FIG. 1, without the vision system;

FIG. 14 is a top view of the third station of the apparatus of FIG. 1;

FIG. 15 is a side elevation view of the third station of the apparatus of FIG. 1 without some components;

FIG. 16 is a side elevation view of a detail of the third station of the apparatus of FIG. 1;

FIG. 18 is a highly enlarged view of a detail of FIG. 14.

DETAILED DESCRIPTION OF THE DRAWINGS

Figure 1:
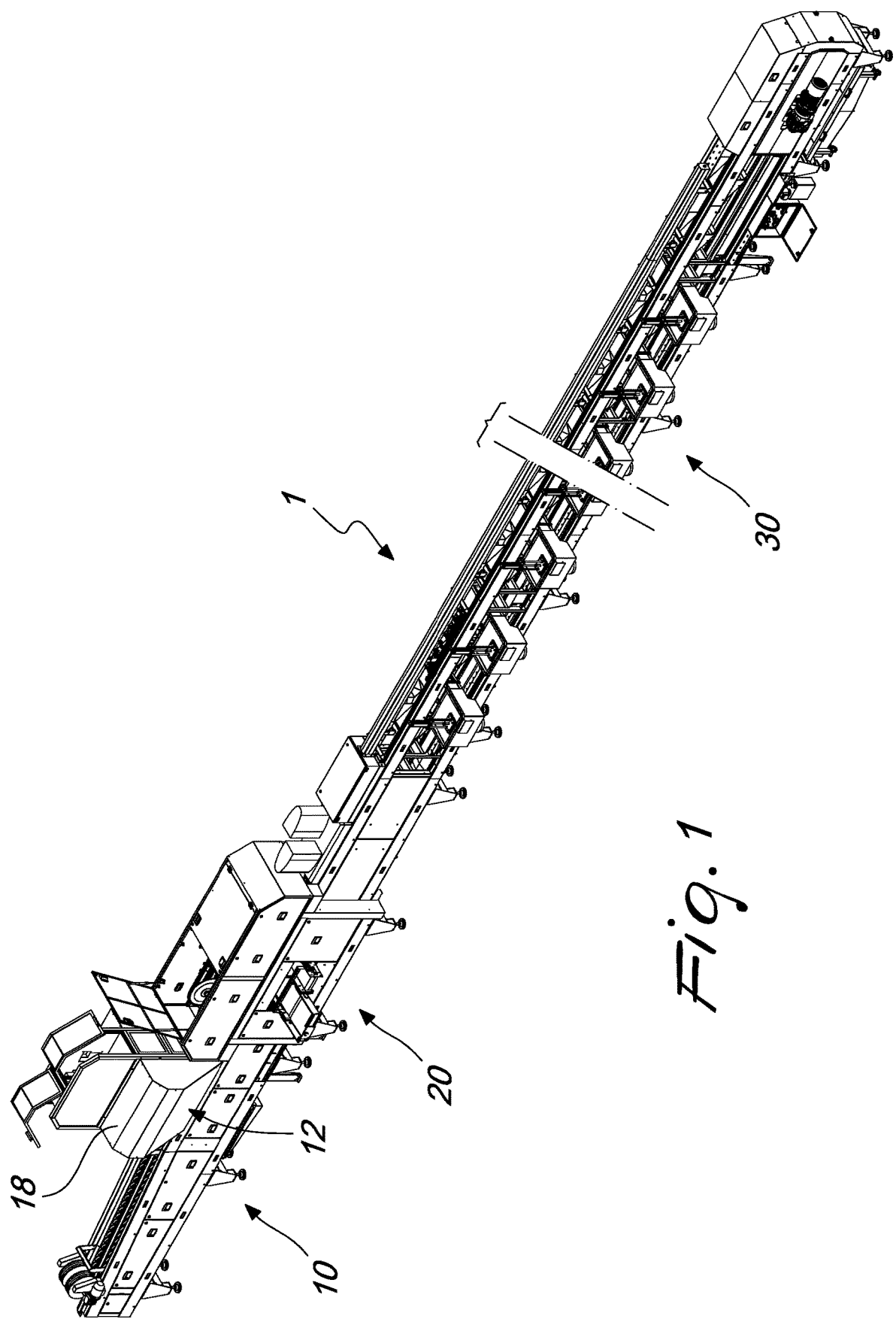
FIG. 1 is a perspective view of the apparatus according to the disclosure.
Figure 2:
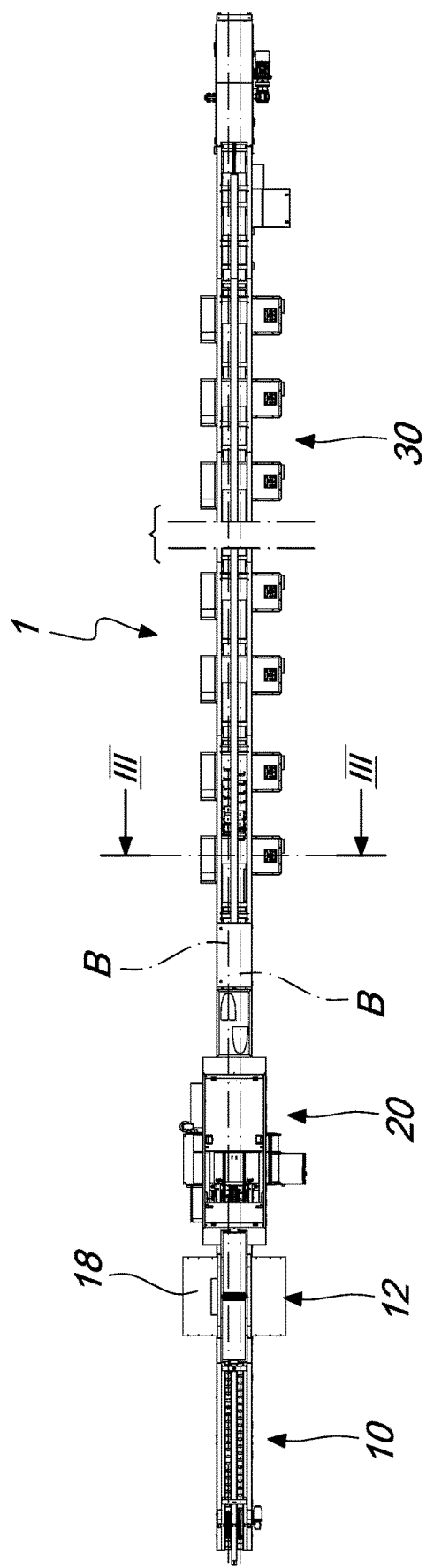
FIG. 2 is a top view of the apparatus of FIG. 1.
Figure 3:
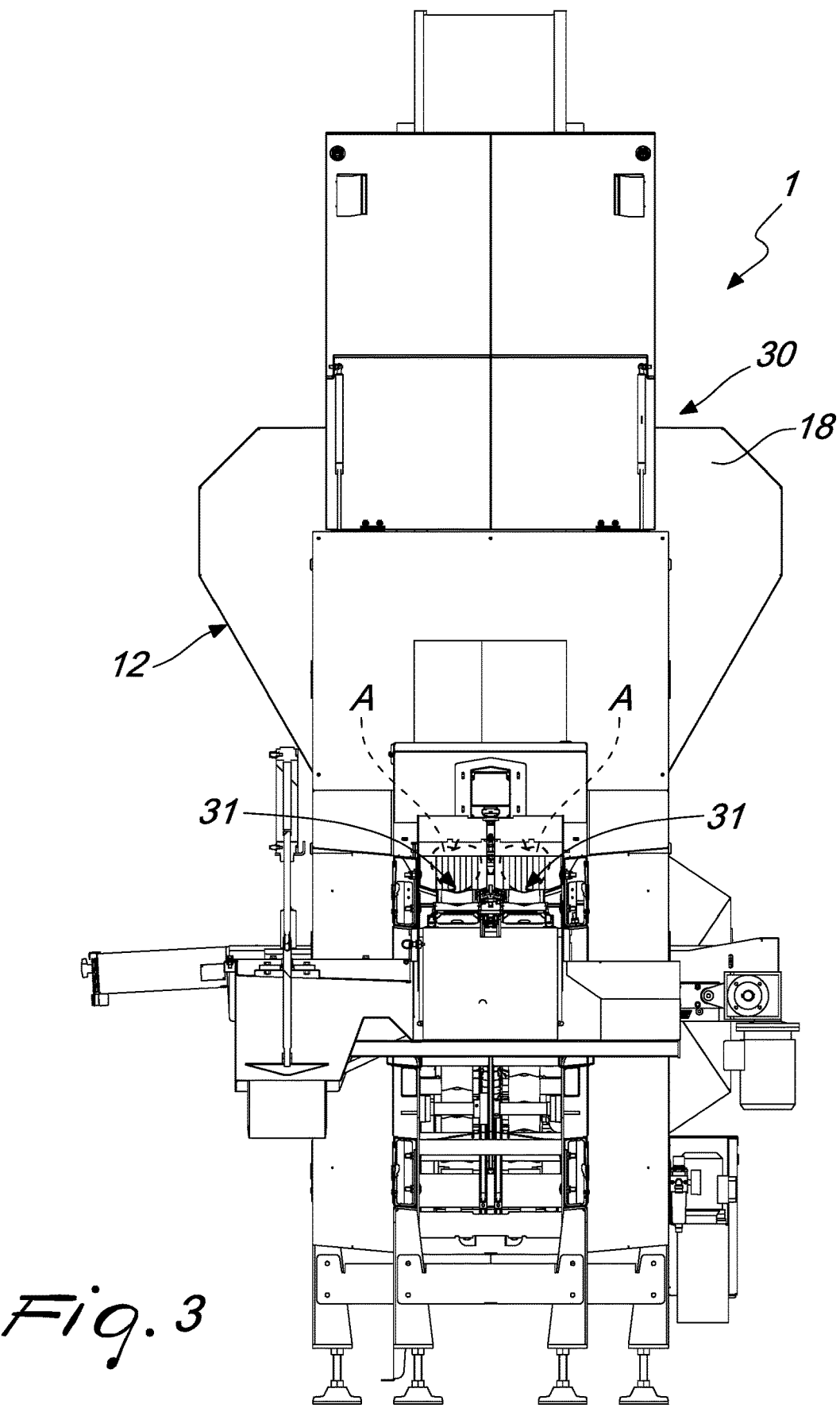
FIG. 3 is a sectional view of FIG. 2, taken along the line III-III.

With reference to FIGS. 1-18, an apparatus for treating horticultural products A (for the sake of simplicity shown only in some figures in dashes) is generally designated by the reference numeral 1.

In this respect, it is specified that in the preferred application of the disclosure the horticultural products A are apples, which are usually fed to the apparatus 1 in a substantially unsorted manner (often, just as they have been harvested from the fields) and therefore with a great heterogeneity in terms of dimensions, color, defectiveness, cleanliness, degree of ripeness, et cetera.

The typical aim of the apparatus 1 is indeed to divide the apples into homogeneous subgroups, at the same time segregating the ones that are rotten or otherwise unsuitable to be marketed.

It is useful to point out, in any case, that use of the apparatus 1 according to the disclosure for other types of treatment and/or for other fruits or horticultural products A in general is not excluded, without thereby abandoning the protective scope claimed herein. More generally, therefore, where in the pages that follow reference shall be made specifically to apples, the teachings described therein must be understood to be extended to any other horticultural product A.

The apparatus 1 comprises in series at least one first station 10, at least one second station 20 and at least one third station 30, crossed in sequence by the horticultural products A, in order to be subjected to treatments and/or checks for which each station 10, 20, 30 is designed. Although in the accompanying figures an apparatus 1 is shown which has only the three stations 10, 20, 30, it is useful to note that providing said apparatus 1 with further stations, be they upstream, downstream or intermediate in relation to the three just introduced, is not excluded.

The first station 10, which as mentioned can be fed directly with apples that are still unsorted, just harvested from the fields, comprises first elements 11 for the individual handling of respective horticultural products A (each first element 11 is thus capable of transfer at most one single horticultural product A).

Since each apple is provided to a respective first element 11, upstream of the first station 10 there is a separator device, even of a known type, capable indeed of receiving masses of apples and providing them one by one to respective first elements 11.

Moreover, the first station 10 comprises at least one vision system 12 (a video camera or a set of video cameras, for example, associated with respective image processing software), capable of acquiring information related to at least one parameter of interest of each horticultural product A.

In this regard, it should be specified that the parameters acquired can be multiple, selected for example (but not exclusively) among dimensions, shape, color, degree of ripeness and/or presence of defects (superficial or internal), or others.

In series to the first station 10 (downstream of the latter), the apparatus 1 thus has a second station 20, which comprises in turn second elements 21 for the individual handling of respective horticultural products A (received, directly or indirectly, from the first elements 11). Each second element 21 is thus also capable of transferring at most one single horticultural product A.

Furthermore, the second station 20 comprises at least one device for weighing each horticultural product A in transit.

Like the vision system 12, the weighing device also can be of any type, and therefore even chosen among those normally used in the sector for this purpose.

In series to the first station 10 and to the second station 20, and downstream of the latter, the apparatus 1 entails a third station 30. The third station 30 comprises third elements 31 for the individual handling of respective horticultural products A (received, directly or indirectly, from the second elements 21). Again, therefore, also each third element 31 is capable of transferring at most one single horticultural product A.

The third station 30 comprises furthermore means 32 for selective conveyance of each horticultural product A in transit toward one of at least two collection areas. Due to the means 32, it is thus possible to sort the horticultural products A into at least two corresponding homogeneous subgroups (each of which is gathered in a respective area) as a function of the information acquired by the vision system 12 and/or by the weighing device.

So far, it is specified that the apparatus 1 (in particular with its stations 10, 20, 30 in series) can be considered as being of a substantially traditional type, and ensures the sorting into different homogeneous subgroups of a mass of apples (or other horticultural products A) supplied in an unsorted manner.

It is specified that the actuation of the means 32 is typically entrusted to an electronic control and management unit (a controller, a computer, a personal computer, or others) which (again in per se known manners) is capable of receiving the information received from the vision system 12 and/or from the weighing device and command accordingly the means 32, as a function of a preset classification criterion (which can also be reprogrammed at will).

By cross-referencing the data collected with the range of parameters previously assigned at each area, the electronic unit is in fact capable of identifying, for each horticultural product A in transit, the more appropriate collection area and activate consequently the means 32, which therefore send to each area all and only the apples that are within the range of parameters assigned thereto.

In each collection area (which can be in any number, as a function of the specific requirements) it is obviously possible to place baskets or containers of another kind, so as to be able to immediately use the collected and uniformly sorted apples (to send them to packaging, to further treatments and/or place them on the market).

According to the disclosure, the first elements 11, the second elements 21 and the third elements 31 are offset along two respective laterally adjacent trajectories B for the advancement of the horticultural products A (the trajectories B are shown for the sake of simplicity only in some figures). Because of the offset, in each station 10, 20, 30 each element 11, 21, 31 that can move along one of the two trajectories B, is thus misaligned transversely with respect to the corresponding elements 11, 21, 31, which can move along the other trajectory B.

This offset is clearly visible for example in FIGS. 4 and 5 (for the first elements 11), 9, 10 and 11 (for the second elements 21) and 14, 16 and 18 (for the third elements 31).

The innovative choice of offsetting the elements 11, 21, 31, which therefore move along two parallel rows but in constant mutual misalignment, allows to achieve the intended aim. First of all, in fact, with respect to lines of the known type (wherein the apples move in a row along the same trajectory) the productivity of the apparatus 1 is clearly doubled, without having to act on the various operating mechanisms and therefore even accepting their inherent speed limitations.

At the same time, the offset allows to keep the space occupation limited (it does not double with respect to known lines but is only slightly increased). In fact, the auxiliary structures and mechanisms, assigned to correct operation and particularly to the handling of each individual element 11, 21, 31 (as well as any further mechanisms that perform other functions), by virtue of the offset, do not have to be necessary laterally adjacent (which would make the total space occupation excessive), but can be at least partially arranged sequentially and alternately along the direction defined by the trajectories B (each laterally adjacent to the respective element 11, 21, 31), reducing considerably the center distance required between the two trajectories B (and the two rows of elements 11, 21, 31 that move along them).

In a preferred embodiment, proposed by way of non-limiting example of the application of the disclosure (FIGS. 4 to 8), each first element 11, which can move cyclically along a first partial portion of one of the trajectories B, comprises at least one pair of rollers 13 arranged mutually close with a substantially horizontal longitudinal axis that is perpendicular to the first portion, in order to constitute jointly a resting element for a respective horticultural product A.

Figure 7:
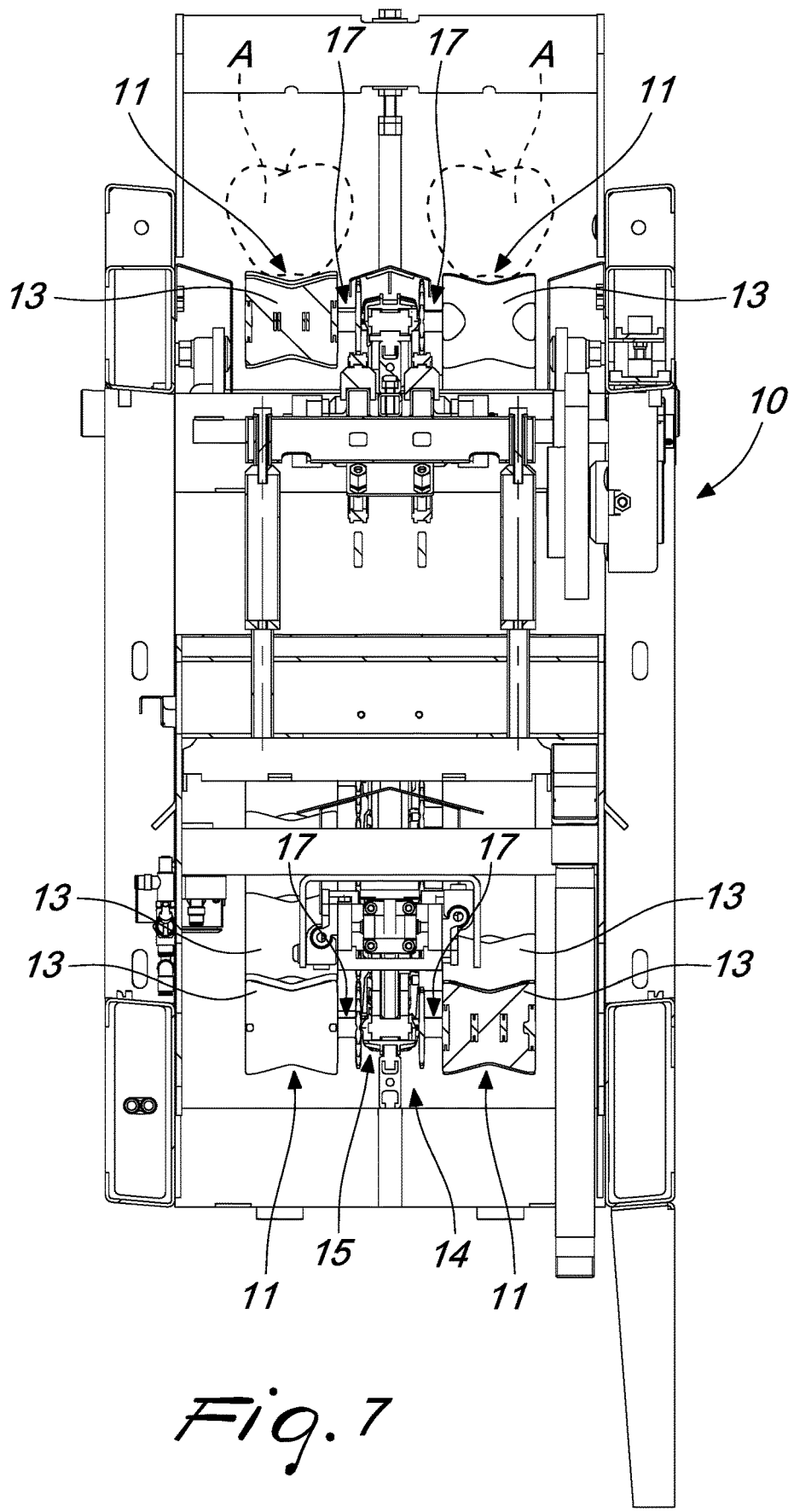
FIG. 7 is a sectional view of FIG. 6, taken along the line VII-VII.
Figure 8:
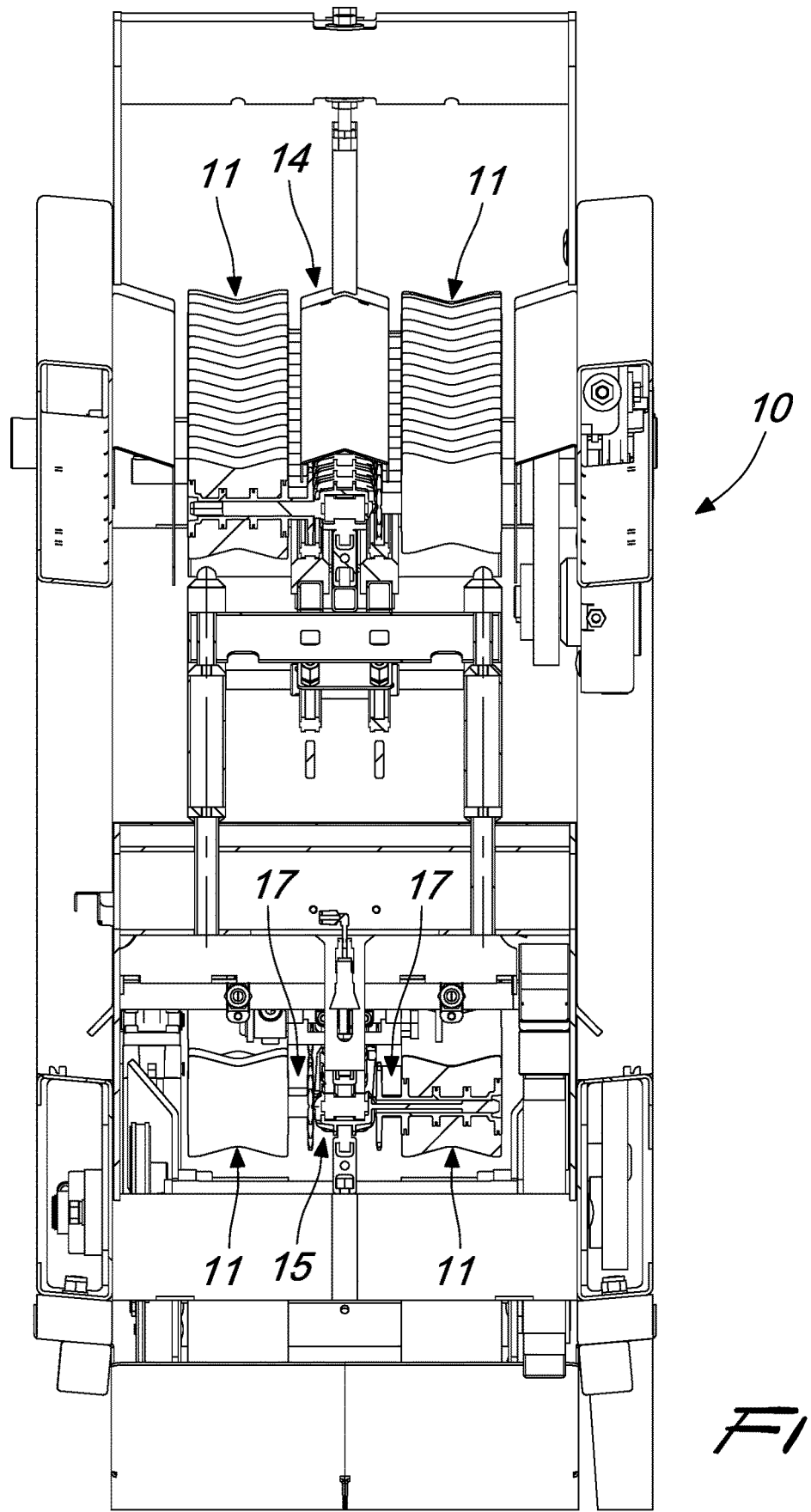
FIG. 8 is a sectional view of FIG. 6, taken along the line VIII-VIII.
Figure 9:
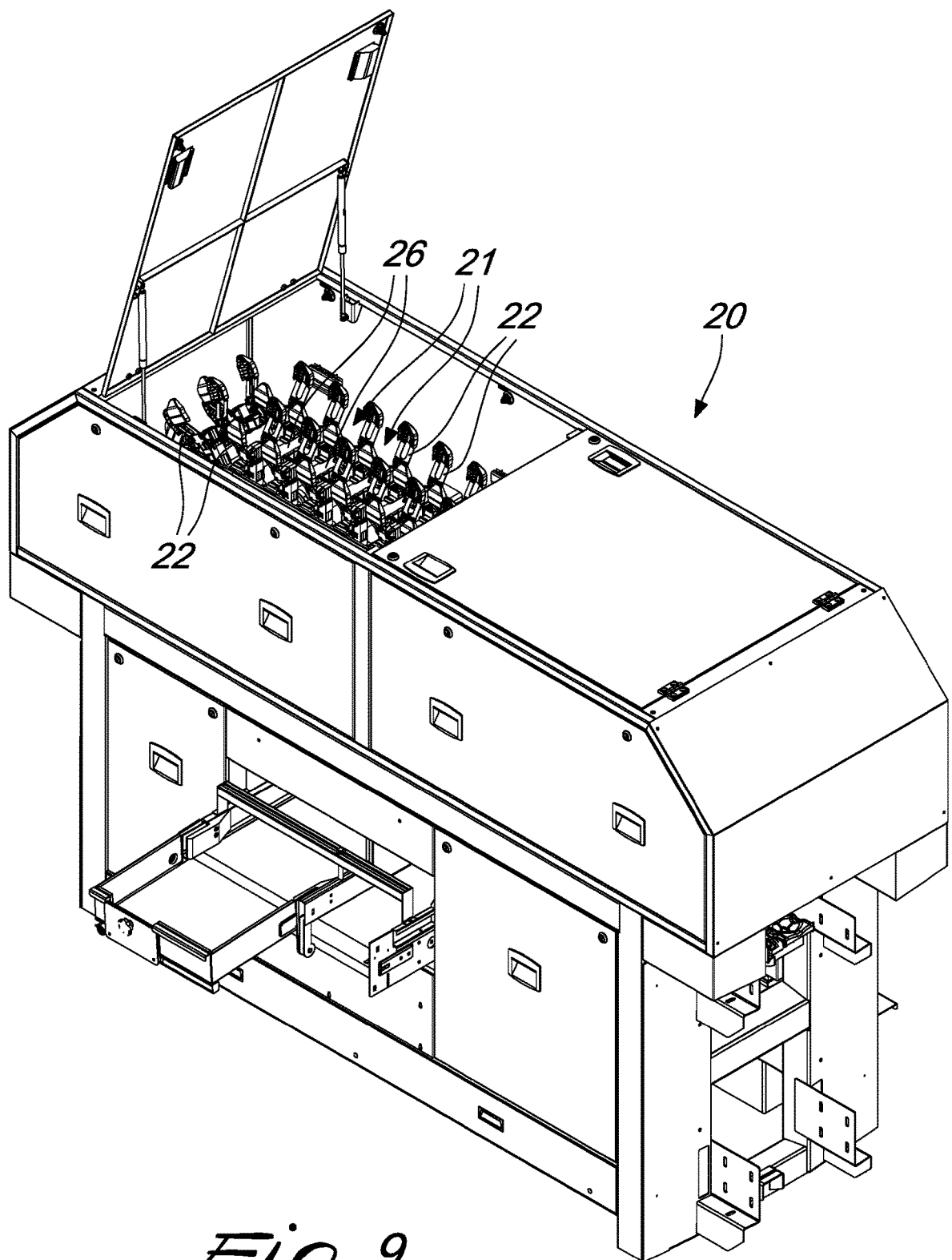
FIGS. 9 and 10 are perspective views from opposite sides of the second station of the apparatus of FIG. 1 with some covering housings opened to show the second elements.
Figure 10:
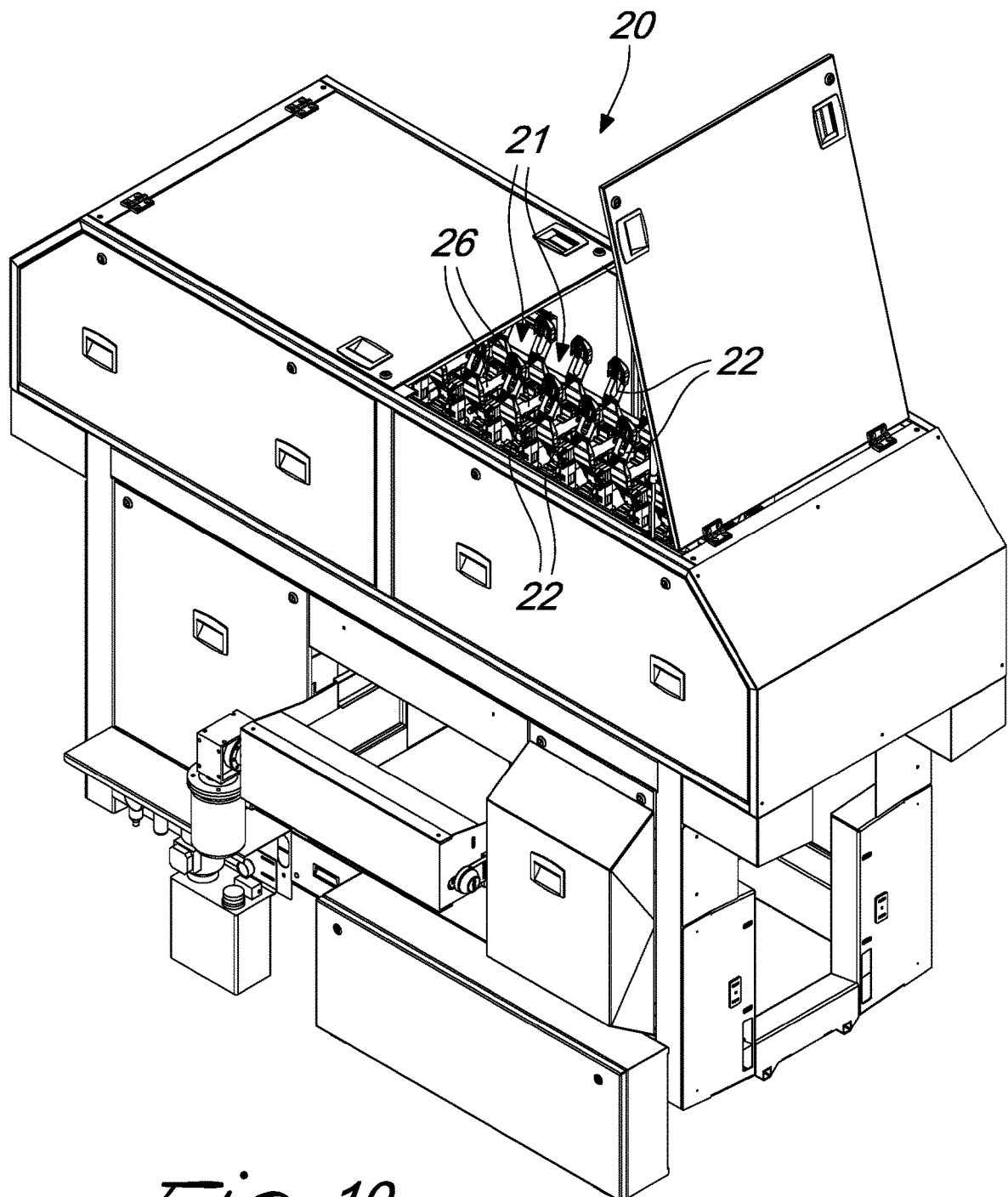

In greater detail, as is evident for example from FIG. 7, each roller 13 has an axially symmetrical extension and has, in its central region, a concavity (defined by a cross-sectional narrowing). Each apple rests stably on the lateral surface of two consecutive rollers 13, exactly at their concavities.

It should be noted moreover that, without abandoning the protective scope claimed herein, this result can be obtained also by providing rollers 13 having another shape, and it is also not excluded to arrange, at right angles to the first portion and instead of a single roller 13, a plurality of flattened rollers 13 (a sort of set of discs) with variable transverse cross-section, which operate jointly like the single roller 13 of the accompanying figures.

Each roller 13 is moved by a respective first traction apparatus 14 along a first closed path, which forms with one of its parts a corresponding first portion.

The first traction apparatus 14 can comprise for example a first belt 15, interposed between the laterally adjacent rows of rollers 13 and wound around two or more first pulleys 16. In this context, each roller 13 is moved along the respective first closed path by a respective first support 17, which is coupled to the first belt 15: it should be noted, therefore, that the mechanisms that are part of the first traction apparatus 14 and are responsible for the movement of the rollers 13, and particularly the first supports 17, are arranged sequentially and alternately between the rollers 13, occupying a reduced space since they are not mutually laterally adjacent but are also in practice arranged in a row.

Usefully, the vision system 12 is placed inside a tunnel 18 that is crossed by the first portions of the laterally adjacent trajectories B, so as to ensure the acquisition of the information related to the parameter of interest of each horticultural product A in low-brightness conditions. The low brightness is useful for optimal operation of the video cameras (too much light might compromise correct image acquisition). Moreover, this allows to ensure uniform brightness conditions over time, without being affected by the outside conditions and by the light variations that can occur in the surrounding environment.

With further reference to the preferred constructive solution, and particularly to FIGS. 9 to 13, each second element 21, which in turn can move cyclically along a second partial portion of one of the two trajectories B, arranged downstream of a respective first portion, comprises a clamp 22 for gripping a respective horticultural product A.

Each clamp 22 is moved by a respective second apparatus 23 for traction along a second closed path, which forms with one of its parts a corresponding second portion.

As already mentioned for the first apparatus 14, the second apparatus 23 also can comprise for example at least one second belt 24 (and for example two, arranged laterally, as in the accompanying figures), wound around two or more second pulleys 25. In this context, each clamp 22 is moved along the respective second closed path by a respective second support 26, which is coupled to the second belt 24.

It should be noted that the second supports 26 also are arranged sequentially and alternately between the clamps 22, occupying a reduced space because they are not laterally adjacent to one another but are in practice arranged m a row.

Advantageously, each clamp 22 is provided with an unloading button 22a, of a per se known type, which can be actuated for the automatic opening of the arms of the clamp 22. For example (FIG. 13), said button 22a can be arranged at the top of the clamp 22 (opposite the free ends of its arms) and can be associated with a mechanism normally arranged so as to interfere with the action of elastic elements, the coupling reaction of which is oriented so as to open the arms of the clamp 22.

At the terminal end of each second portion directed toward the third station 30 there is therefore a fixed body for affecting the buttons 22a. This determines the automatic actuation of the buttons 22a (upon reaching said terminal end of the second portions) and the consequent release (by gravity) of the horticultural products A gripped by the clamps 22 toward corresponding third elements 31 of the third station 30.

Obviously, closure of the arms of the clamps 22 is actuated from the opposite side when said clamps return to the beginning of the second portion, in order to grip each apple, conveyed there by the rollers 13 of the first station 10.

It is now useful to specify that the weighing device also can be chosen among the many of the known type and thus can be of immediate practical implementation for the person skilled in the art (as is already, besides, the vision system 12). The possibility is therefore mentioned that each clamp 22 can be temporarily lifted in relation to the vertical height at which it moves forward during the second portion of the trajectory B: due to the lifting, the clamp 22 bears temporarily on the respective second support 26 only with its weight (which is known) and the weight of the apple being carried. During lifting, the clamp 22 is weighed therefore by a load cell (or other device) in order to obtain the desired data item, related to the weight of the apple.

Advantageously, the second station 20 comprises an intermediate unloading assembly 27 (FIG. 11), which can be actuated selectively to command the release of the horticultural products A, while they are moved by the second elements 21, as a function of the information acquired by the vision system 12 and/or by the weighing device, and therefore before being delivered to the third station 30.

For this purpose, therefore, the unloading assembly 27 also is preferably controlled by the electronic control and management unit.

The assembly 27 comprises a movable body 28 for affecting the buttons 22a, which is arranged along each second portion of the two trajectories B and preferably (but not exclusively) downstream of the weighing device (so as to be able to choose early unloading also as a function of weight). The movable body 28 can thus be actuated to pass from an inactive configuration, in which it does not interfere with the passage of the buttons 22a, to an active configuration, in which it is arranged so as to affect the buttons 22a, for the early release of the horticultural products A, upstream of the third station 30.

Figure 11:
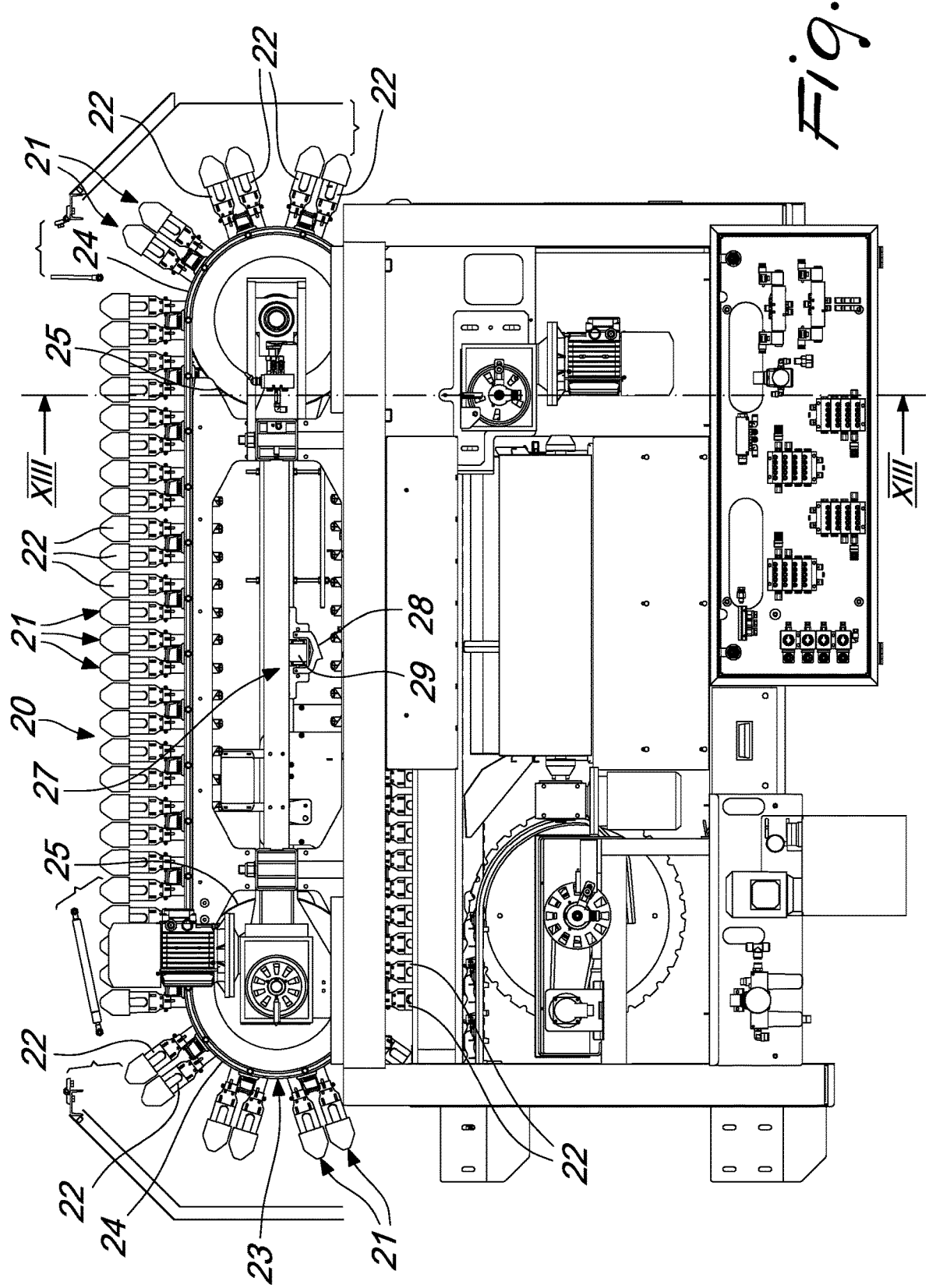
FIG. 11 is a sectional view, taken along a longitudinal line, of the second station of the apparatus of FIG. 1.
Figure 12:
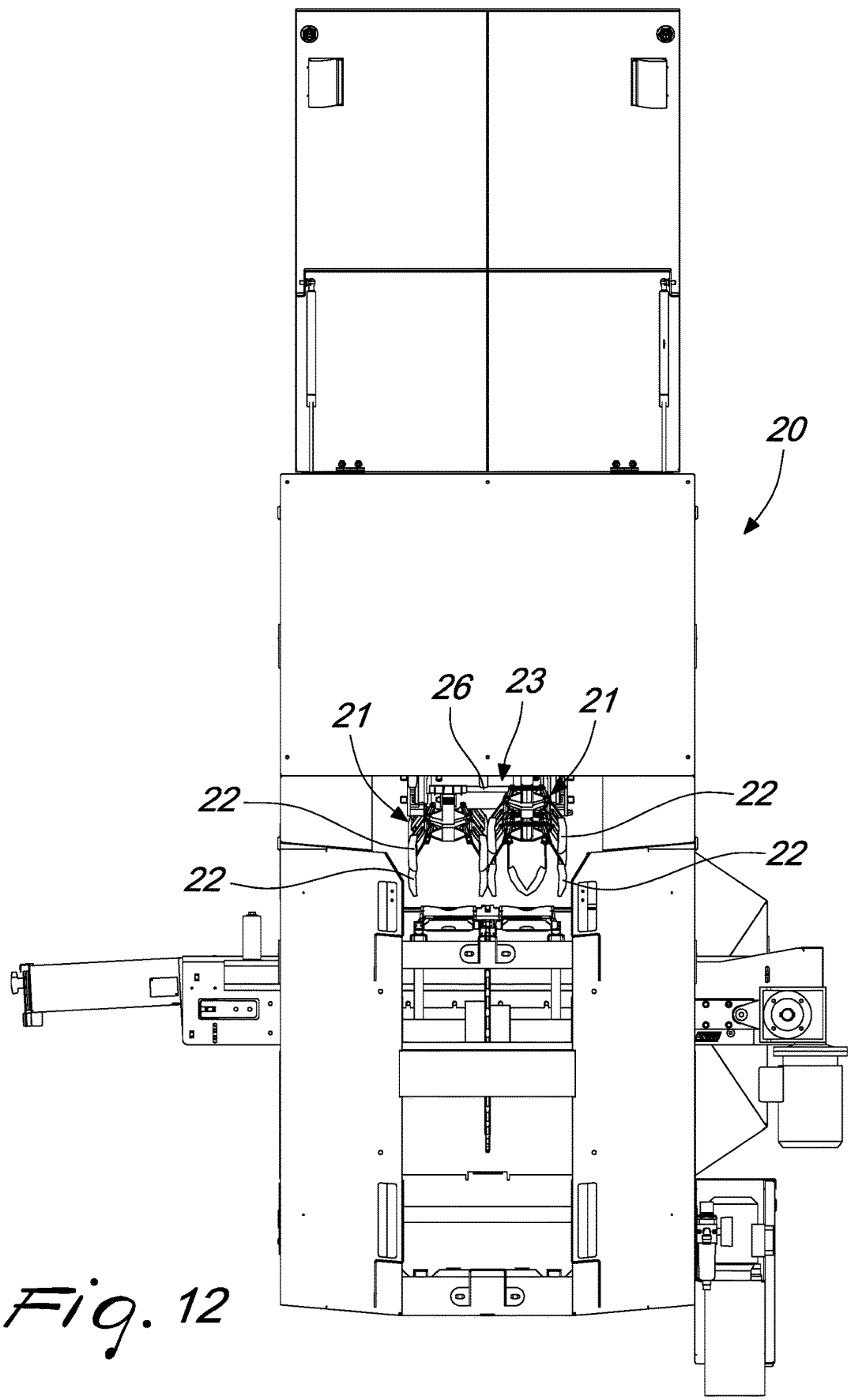
FIG. 12 is a front view of the second station of the apparatus of FIG. 1.
Figure 13:
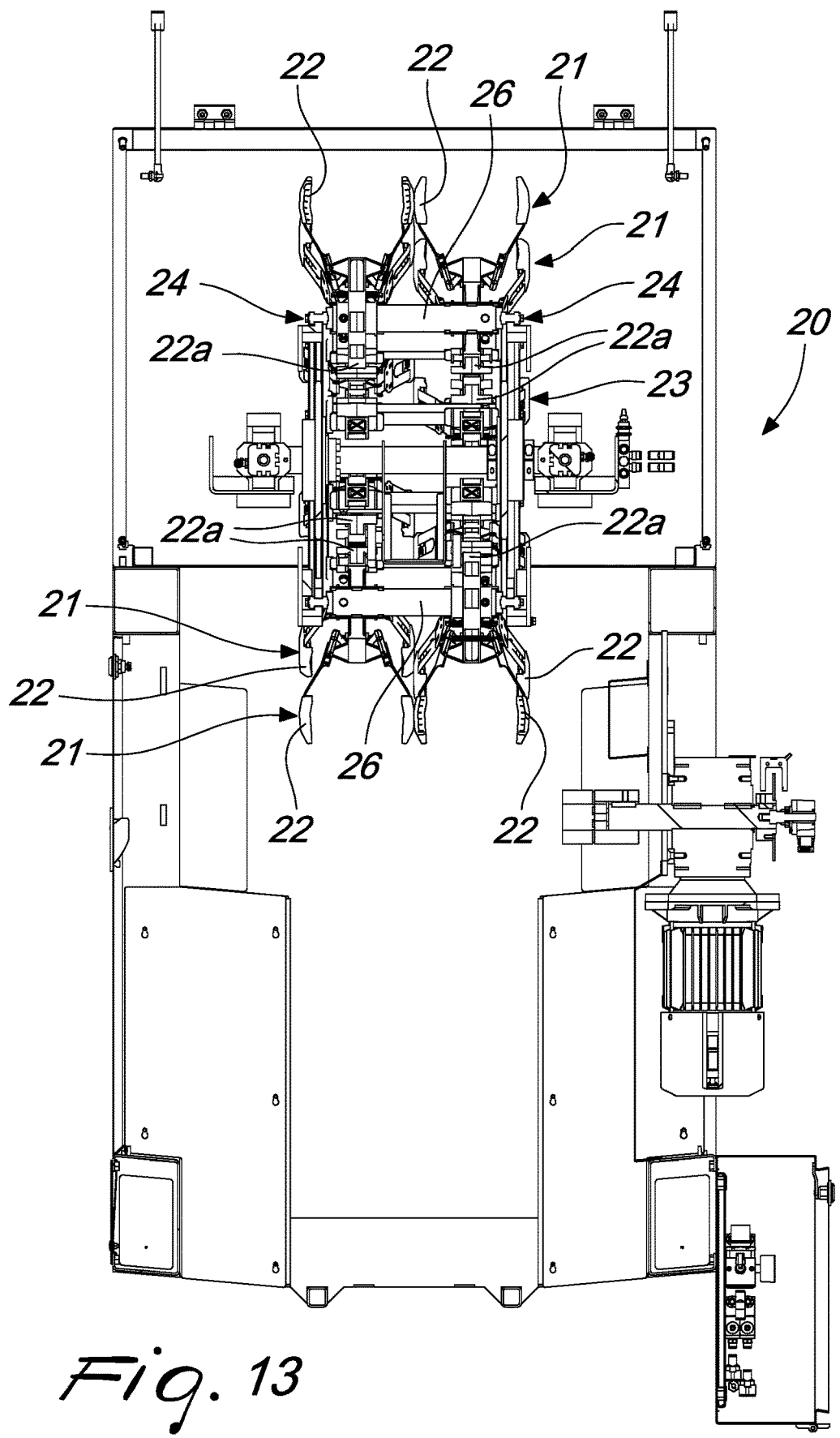
FIG. 13 is a sectional view of FIG. 11, taken along the line XIII-XIII.
Figure 17:
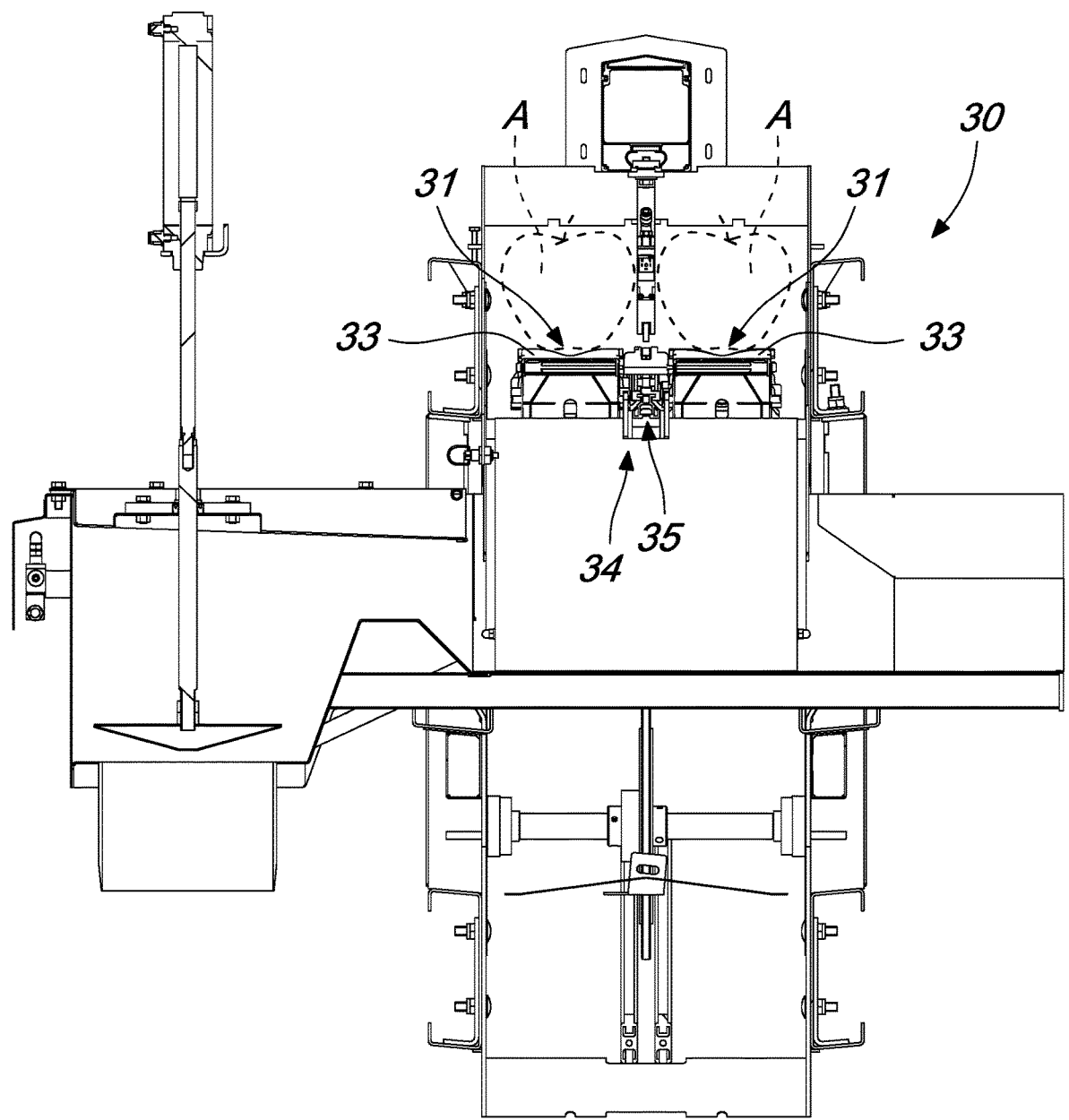
FIG. 17 is a sectional view of FIG. 14, taken along the line XVII-XVII.

With reference to the preferred solution, illustrated indeed in FIG. 11, the movable body 28 is a sort of conveniently profiled cam, which can oscillate about a working axis that is aligned with the trajectories B. The oscillation (actuated by a respective actuator 29, which in turn is actuated by the control and management unit) moves the cam from the inactive configuration, in which it does not interfere in any way with the movements of the buttons 22a, to the active configuration, and vice versa. In the active configuration the useful profile of the cam is arranged so as to affect the buttons 22a, so as to actuate automatically the opening of the arms of the respective clamp 22.

The presence of the unloading assembly 27 is of unquestionable practical interest, since it offers an optional additional functionality, which indeed includes the possibility to set an additional apple classification or separation parameter, preventing them from proceeding toward the third station 30 when appropriately chosen conditions are detected.

For example, it is possible to avoid sending to the third station 30 all the apples that the vision system 12 has found to be internally rotten, thus being able to move them promptly away from the apparatus 1. This is very important, because otherwise they would stay proximate to or in contact with the others, potentially facilitating the rotting also of the latter.

With further reference to the preferred constructive solution, and to FIGS. 14 to 18, each third element 31, which in turn can move cyclically along a third partial portion of one of the two trajectories B, arranged downstream of a respective second portion, comprises a tray 33 adapted to support and contain a respective horticultural product A. Each tray 33 is thus moved by a respective third traction apparatus 34 along a third closed path, which forms with one of its parts a corresponding third portion of each one of the trajectories B.

As already mentioned for the first apparatus 14 and the second apparatus 23, the third apparatus 34 also can for example comprise a third belt 35 (or similar traction mechanism), wound around two or more third pulleys. A single third belt 35 (with the respective third supports of the trays 33) is interposed between the two offset rows of trays 33.

Once again, therefore, the mechanisms that are part of the third traction apparatus 34 and are responsible for the movement of the trays 33 also occupy a reduced space, allowing containment of the overall volume.

Usefully, and as can be seen particularly in FIGS. 16 and 18, each tray 33 can rotate at least partially about a main axis that is transverse to the corresponding third portion, for its temporary transition, controlled by the means 32, from a substantially horizontal arrangement, in which the respective horticultural product A is normally conveyed along the corresponding third portion, to an inclined (or even vertical) arrangement, for the release of the corresponding horticultural product A toward one of the collection areas.

It should be noted that multiple chutes 36 that lead to respective collection areas are preferably arranged along the third station 30.

When the means 32 actuate the rotation of a tray 33 from the horizontal arrangement to the inclined arrangement (according to per se known methods), the apple A, carried until that point by the tray 33, falls or rolls by gravity toward the chute 36, which conveys it toward the designated collection area.

The electronic control and management unit can thus control the rotation of each tray 33 at a chosen one of the chutes 36, indeed to sort into homogeneous subgroups (collected in the respective collection areas) the entire mass of apples fed initially to the first station 10.

Operation of the apparatus 1 according to the disclosure, and with it the methods with which it reaches the intended aim and objects, have thus already been shown.

It has in fact already been shown that the first station 10 is fed with extremely heterogeneous apples, which are rested stably on the first elements 11 (consecutive pairs of rollers 13), which move in an offset arrangement along the first portion of laterally adjacent trajectories B (rectilinear or also curvilinear).

After being analyzed by the vision system 12, which detects one or more parameters of interest providing them to the control and management unit, at the end of the first portion of the trajectories B the apples are gripped by the second elements 21, which move in an offset arrangement along the second portion of the laterally adjacent trajectories B.

While the apples travel along the second portion, they are weighed and the related data item is also provided to the electronic control and management unit.

Before reaching the third station 30, each apple passes in the range of the intermediate unloading assembly 27, which can be actuated by the electronic unit in order to force the fall of all and only the apples that are considered not suitable to continue.

At the third station 30 the products A are deposited on corresponding trays 33 (the third elements 31), which move in an offset manner along the third portion of the laterally adjacent trajectories B. While they travel along the third portion, the means 32, actuated by the electronic control and management unit, make each apple fall along the chute 36 that leads to the desired collection area.

As already observed more than once, therefore, the choice to offset the first elements 11, the second elements 21 and the third elements 31 allows to double the number of apples circulating in the unit time, and therefore the productivity, without affecting significantly the overall volume, which thus remains modest.

The apparatus 1 according to the disclosure is thus capable of distributing in a homogeneous manner apples or other horticultural products A, ensuring high productivity and small volumes (and offering further options with the intermediate unloading assembly 27).

The disclosure thus conceived is susceptible of numerous modifications and variations, all of which are within the scope of the appended claims; all the details may further be replaced with other technically equivalent elements.

In the exemplary embodiments shown, individual characteristics, given in relation to specific examples, may actually be replaced with other different characteristics that exist in other exemplary embodiments.

In practice, the materials used, as well as the dimensions, may be any according to requirements and to the state of the art.

The disclosures in Italian Patent Application no. 102017000052593, from which this application claims priority, are incorporated herein by reference.

The invention claimed is:

1. An apparatus for treating horticultural products, comprising in series at least:
   a first station comprising first elements for the individual handling of respective horticultural products, and at least one vision system, for the acquisition of information related to at least one parameter of interest of each horticultural product,
   a second station distinct from the first station, said second station comprising second elements for the individual handling of respective horticultural products and at least one device for weighing each horticultural product in transit, and
   a third station distinct from the first station and the second station, said third station comprising third elements for the individual handling of respective horticultural products and means for selective conveyance of each horticultural product in transit toward one of at least two collection areas, for the sorting of the horticultural products into at least two corresponding homogeneous subgroups as a function of the information acquired by said vision system and/or by said weighing device,
   wherein said first elements, said second elements, and said third elements are mutually distinct such that each of said first elements, said second elements, and said third elements are offset along two respective laterally adjacent trajectories for the advancement of the horticultural products, in each said station, and due to the offset, each said element, movable along one of said trajectories, being misaligned transversely with respect to the corresponding said elements, which is configured to move along the other one of said trajectories.

2. The apparatus according to claim 1, wherein each one of said first elements are configured to move cyclically along a first partial portion of one of said trajectories, comprises at least one pair of rollers arranged mutually close with a horizontal longitudinal axis that is perpendicular to said first partial portion, in order to constitute jointly a resting element for a respective horticultural product, each one of said rollers being moved by a respective first apparatus for traction along a first closed path, which forms, with one of its parts, the corresponding said first partial portion.

3. The apparatus according to claim 2, wherein said vision system is arranged inside a tunnel that is crossed by said first partial portions of said laterally adjacent trajectories.

4. The apparatus according to claim 2, wherein each one of said second elements are configured to move cyclically along a second partial portion of one of said trajectories, arranged downstream of a respective said first partial portion, comprises a clamp for gripping a respective horticultural product, each one of said clamps being moved by a respective second apparatus for traction along a second closed path, which forms with one of its parts the corresponding said second partial portion.

5. The apparatus according to claim 4, wherein each one of said clamps is provided with an unloading button, which is configured to be actuated for the automatic opening of said clamp, at the terminal end of each one of said second partial portions that is directed toward said third station there being a fixed body for affecting said buttons, for the automatic actuation of each one of said buttons and the consequent release of the horticultural products gripped by said clamps toward corresponding said third elements of said third station.

6. The apparatus according to claim 1, wherein said second station comprises an intermediate unloading assembly, which can be actuated selectively to release the horticultural products, moved by said second elements, as a function of the information acquired by said vision system and/or by said weighing device.

7. The apparatus according to claim 6, wherein said assembly comprises a movable body for affecting said buttons, which is arranged along each one of said second partial portions and is configured to be actuated selectively to pass from an inactive configuration, in which it does not interfere with the passage of said buttons, to an active configuration, in which it is arranged so as to affect said buttons, for the early release of the horticultural products, upstream of said third station.

8. The apparatus according to claim 4, wherein each one of said third elements, which is configured to move cyclically along a third partial portion of one of said trajectories, arranged downstream of a respective said second partial portion, comprises a tray adapted to support and contain a respective horticultural product, each one of said trays being moved by a respective third apparatus for traction along a third closed path, which forms with one of its portions a corresponding said third partial portion.

9. The apparatus according to claim 8, wherein each one of said trays is configured to rotate at least partially about a main axis that is transverse to the corresponding said third partial portion, for its temporary transition, controlled by said means for selective conveyance, from a horizontal arrangement, in which the respective horticultural product is normally conveyed along the corresponding said third partial portion, to an inclined arrangement, for the release of the corresponding said horticultural product toward one of said collection areas.

* * * * *